No. 657,146. Patented Sept. 4, 1900.
J. E. WILLIAMSON.
APPARATUS FOR FILTRATION.
(Application filed Feb. 13, 1899.)
(No Model.) 3 Sheets—Sheet 2.

WITNESSES:
Fred White
Thomas F. Wallace

INVENTOR:
James E. Williamson,
By his Attorneys,

UNITED STATES PATENT OFFICE.

JAMES E. WILLIAMSON, OF NEW YORK, N. Y., ASSIGNOR TO HENRY B. ANDERSON, OF SAME PLACE.

APPARATUS FOR FILTRATION.

SPECIFICATION forming part of Letters Patent No. 657,146, dated September 4, 1900.

Application filed February 13, 1899. Serial No. 705,379. (No model.)

*To all whom it may concern:*

Be it known that I, JAMES E. WILLIAMSON, a citizen of the United States, residing in the city, county, and State of New York, have invented certain new and useful Improvements in Apparatus for Filtration, of which the following is a specification.

This invention relates to filtration, and provides an improved filtering apparatus especially adapted to what is known as "sedimentation" or "coagulation" filtration.

In coagulation filtration it has been common to introduce a coagulating agent into the water in the supply-main and either discharge the resulting solution into settling-tanks, in which it stands until the coagulum is settled, after which the clarified water is conducted either directly or through a filter-bed to the service-pipes, or to feed the solution from the supply-main directly to the filter-bed, relying on the latter to arrest the coagulum pending the withdrawal of the clarified water to the service-pipes. The former may be termed an "intermittent process," and the latter a "continuous process." My invention aims to provide apparatus with which sedimentation can be obtained before the water reaches the filter-bed and the filtration can be carried out as a practically-continuous process, even when a coagulating agent is employed, without permitting the sediment or coagulum, which could be arrested in a settling-tank, to enter the filter-bed. In this way the life of the filter-bed—*i. e.*, the period between washings—is greatly prolonged and the capacity of the apparatus in proportion to its size is greatly increased.

According to my improved apparatus I provide a plurality of settling-tanks between the supply-main and the service-pipe or between such main and the filter-bed, if the latter is used, and I provide means, preferably automatic, for alternately discharging first one tank and then another into the service-main or filter-bed, means for emptying the settling-tank during precipitation, means for charging one tank during the emptying of another, and certain other features of improvement, all of which will be hereinafter set forth, and in the preferred manner of use I rapidly charge one tank with solution and maintain its contents at rest until precipitation has progressed far enough to have caused the formation of distinct strata of superposed pure water and coagulum simultaneously with discharging from another tank, controlling the discharge from one tank by the level in the other tank and the feed to each tank by its own liquid-level, and I withdraw the purified water from the tanks at successively-lower points within the stratum of purified water, lowering the point of withdrawal to follow the descent of the stratum of coagulum.

In the accompanying drawings, which illustrate the preferred form of my improved apparatus.

Referring to the drawings, let A designate one tank, and A' another tank, of a plurality of settling-tanks; B, a supply-main, and B' B" its spouts for discharging into the tanks A A', respectively; C and C', supply-valves for these spouts, respectively; D D', the discharge-pipes from the respective tanks, and D" the discharge-main fed by these pipes; E and E', the discharge-valves for the respective discharge-pipes; F, the source of supply for a coagulating agent to the main B; G overflows, and H the washouts, for the tanks, and Y a filter-bed by-pass pipe. These parts may be of any usual or suitable construction adapted for filtration on either a large or small scale.

According to one feature of my improved apparatus the opening of the supply-valve of each tank is controlled by the water-level in such tank, and the opening of the discharge-valve of a tank is controlled by the water-level of the other tank, while the closing of the supply-valve to each tank is controlled by its own water-level, and means are provided for so timing the closing of the discharge of a tank that its discharge will cease before feed to it starts and that the discharge from the adjacent tank will commence with the termination of the discharge from the next tank. In this manner the tanks are caused to alternately fill and empty, the one filling while the other is discharging and each starting its discharge as the other ceases to discharge. The speeds of the filling and discharging are so adjusted that a tank will be rapidly filled and its contents will have an opportunity to come to rest, so that settling may be well advanced during the time required for discharging from the next tank, thus assuring a predetermined extent of precipitation before discharge from a tank begins, so that in each tank prior to the time for opening its discharge there shall be a stratum of predetermined depth of clear water within the tank.

According to another feature of my improved apparatus I provide a movable discharge-spout adapted to rise and fall with the level of the liquid in the tank and means for moving this spout, the spout being adapted to take water from the tank at near the surface of the water and preferably at a varying depth from the surface as the level of the water descends, so that outflow from the tank may be taken within the stratum of clear water above the stratum of coagulum, the point of discharge may follow the descent of the coagulum, and the proximity of the discharge-outlet to the surface may increase as the depth of water in the tank, and consequently the depth of the stratum of pure water, diminishes.

In the particular details of construction and arrangement of my improved apparatus I prefer to operate the inlet and discharge valves by hydraulic cylinders or other equivalent means adapted to quickly throw the valves from one position to another, and, as shown, I provide cylinders I I' for the respective supply-valves and a single cylinder I'' for the two discharge-valves, providing a piston J in each cylinder for operating the valve in each case, a piston-rod J' between this piston and the valve in the case of the supply-valves, and a piston-rod J'' between the piston J and connecting it and both the valves E and E' for the discharge-valves. I provide controlling-valves K, K', and K'', respectively, for the cylinders I I' I'', feed-pipes L, communicating between any suitable source of fluid-pressure and these valves, cylinder-pipes M M', N N', and O O' for the cylinders I I' I'', respectively, and waste-pipes P, P', and P'' for these cylinders, respectively.

For operating the valves K K', I employ floats Q Q', respectively, which are shown as weighted and each of which rises with the filling of its tank until its upward movement has turned the valve to which it is connected to the position for closing the feed to its tank. To retain a supply-valve in a closed position, I utilize an arm or holder R or R' for each valve and a catch S or S' for each holder, the catch being adapted to lock the arm in the closed position when the float has risen sufficiently and to hold it there until the catch is released. I utilize an automatic trip for releasing the catch in each instance, this preferably consisting of a weighted or gravity lever T or T', swung from one side to the other of its dead-center and adapted in its fall to trip the catch. Floats V V' respectively control and operate the levers T T', each float being connected to its lever by a slotted rod V'', engaging a pin $a$ on the trip with a predetermined amount of lost motion. Each trip-lever is connected to the arm W of the valve K'', slotted links W' W'' being utilized for this purpose, each having sufficient lost motion to permit the throwing back of either trip without shifting the valve, while insuring that after the valve has been shifted by the fall of one trip it will be reversed upon the fall of the other.

Figure 3:
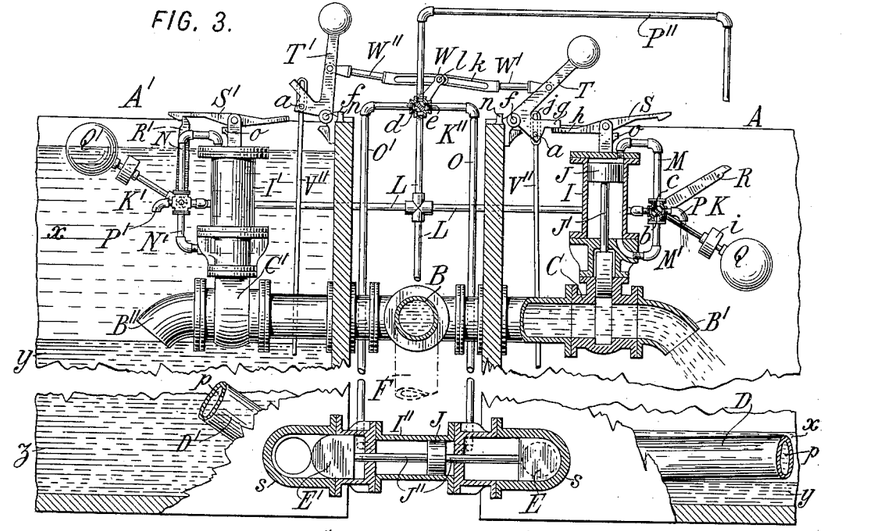
Fig. 3 is an enlarged fragmentary sectional view, partly in elevation, corresponding generally to Fig. 1, but showing the parts in the next position to that they occupy in Fig. 1—namely, in which the right-hand tank has ceased to discharge and is filling and the left-hand tank has begun to discharge.

The valves K K' K'' are four-way valves, each when in one position supplying water under pressure to one side of the piston of its cylinder and permitting outflow of water from the other side of such piston to its waste-pipe. As shown in Fig. 3, the port $b$ of the valve K has opened communication between the pressure-pipe L and cylinder-pipe M', thus introducing pressure beneath the piston J and lifting the valve C, while the port $c$ of the valve K communicates between the pipe M and the waste P, thus permitting the escape of water from above the piston J into the tank A. The piston J will hold the valve C open so long as the valve K stands in the position shown and until the float Q rises sufficiently to reverse the port communications, whereupon the port $b$ will open pipe M' to waste P, permitting escape of the water from beneath the piston J, and the port $c$ will open the pipe L to pipe M, thus introducing water under pressure above the piston J, which will quickly depress the latter and abruptly close the valve C. The valve K will remain in the position for holding valve C closed so long as the float Q is elevated, which will be until the catch S is tripped, since the rise of the float necessary to shift the valve K is such as to cause the holder R to be engaged by the catch before the valve K is reversed.

The valve K' is identical in construction with the valve K. The valve K'' is a passive valve. When in one position its port $d$ opens communication between pipe L and pipe O', supplying pressure at the left of the piston J in the cylinder J'', while its port $e$ permits waste from the right of the piston J through pipe O and waste P'' into tank A. In the other position the valve connects pipes L and O, supplying pressure at the opposite side of the piston J, and connects pipes O' and P'', releasing pressure from the left of the piston J.

Figure 1:
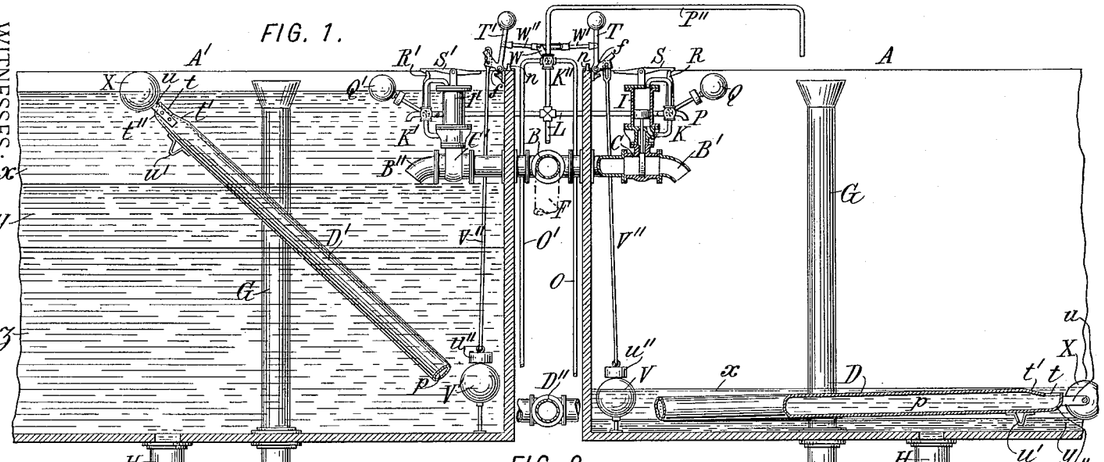
Figure 1 is a fragmentary vertical section of my improved settling-tank, the right-hand tank discharging and about to terminate its discharge and start filling and the left-hand tank being filled with its contents at rest and settling, the stratum of coagulum having descended sufficiently to leave a suitable stratum of clear water from which the discharge can be taken when desired.
Figure 2:
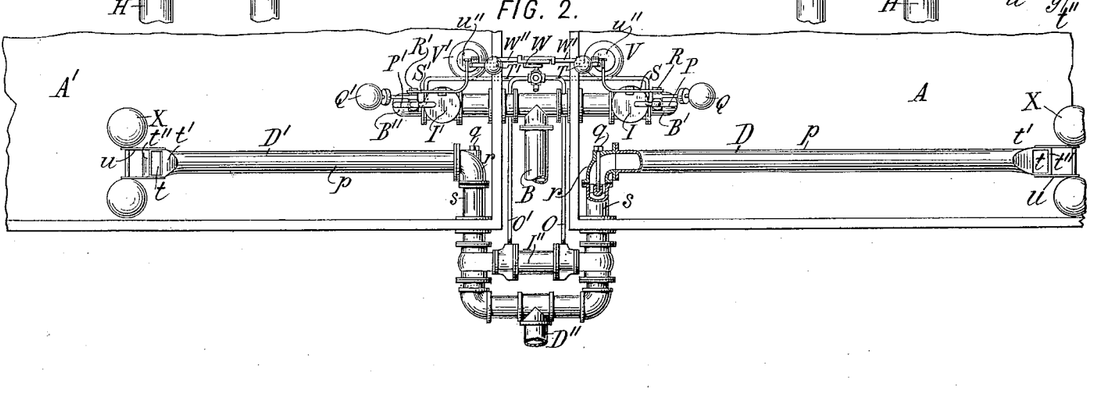
Fig. 2 is a fragmentary plan view thereof, partly in section.
Figures 4, 5, 6:
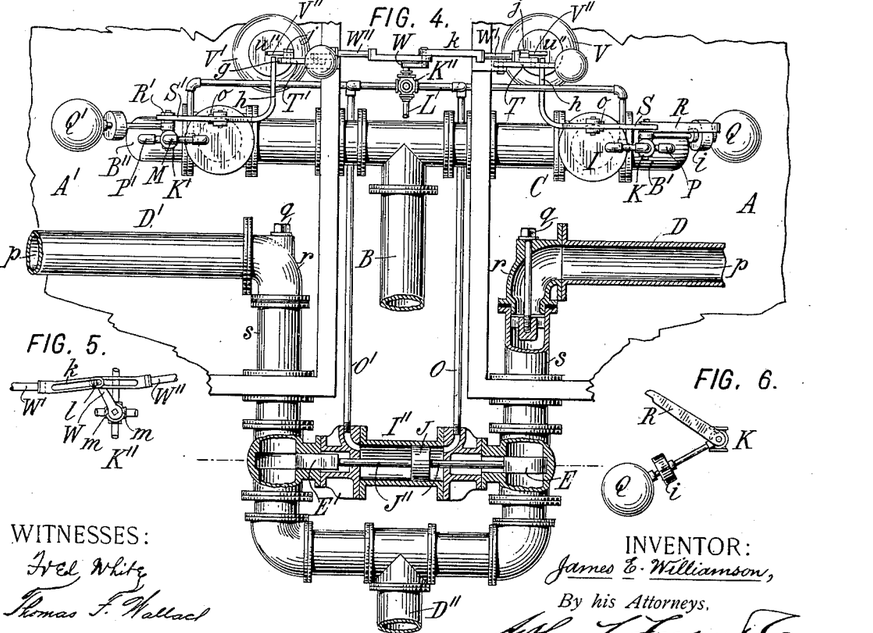
Fig. 4 is a fragmentary plan view of the parts in the position shown in Fig. 3, the view being partly in section.
Fig. 5 is a fragmentary rear view of the discharge-controlling valve.
Fig. 6 is a similar view of one of the supply-controlling valves.

Each float V V' moves sufficiently to throw its trip from one side to the other of the dead-center $f$, on which the trip is pivoted, to cause it to operate at the desired time and has sufficient lost motion to permit the free operation of the trip as soon as the float has fulfilled its function. In Fig. 1 the float V has descended until it is pulled almost past the dead-center, so that the trip is about to fall. As soon as it overbalances and trips its finger $g$ will strike the tail $h$ of the catch S, causing the catch to tilt and release the holder R, whereupon the weight $i$ of the float Q will drop and reverse the valve K. The slot $j$ in the rod V'' is long enough to permit a free falling of the trip after it passes the dead-center. The slot $k$ in the link W' is long enough to permit the trip to start falling past its dead-center before the end of the slot $k$ engages the pin $l$ of the arm W, so that the trip may gain considerable speed and momentum before this engagement. When the link W' engages the pin $l$, the falling trip will in its further movement shift the arm W to the reverse position, the limit of movement of this arm being determined by stops $m$. (See Fig. 5.) The trip T will continue to fall until the arm W is arrested by the adjacent stop $m$, which will be when the valve K'' is in position to reverse the discharge-valves. The trip will then remain in its depressed position until gradually restored by its float as its tank refills, passing the dead-center and coming to a position of rest, in which it is held by the float or by its weight. In thus restoring the trip its link rides idly on the pin of the arm W, and its finger $g$ leaves the catch S free to fall into the active position, where it remains until the charging of the tank has progressed sufficiently for the float Q to move the holder R into engagement with the catch, at which time the valve C is closed and the tank stands filled and at rest. During this period of rest, which will exist until the opposite tank is emptied sufficiently for its float to operate its trip, the precipitation of sediment may progress in the tank so charged. By suitable adjustment the period can be made such that a clear stratum of pure water will be formed before discharge from the tank begins, as indicated in the drawings, in which $x$ represents the stratum of pure water, $y$ the stratum of descending coagulum, and $z$ the solution. The upward movement of each trip T may be limited by a stop $n$, and the tilting of each catch may be limited by a stop $o$.

Another feature of improvement refers to the outlet or discharge pipes D and D'. According to my invention these are adapted to vary the elevation of the point of discharge from each tank according to the level of liquid therein, and preferably also to vary the proximity of the discharge-outlet relatively to the surface of the liquid, so that the outlet shall approach the surface with the fall of the level. This may be accomplished in any suitable manner; but I prefer to construct each discharge-pipe as a swinging tube $p$, fulcrumed at one end on an axis $q$ by an elbow-joint $r$ to the outleading pipe $s$ and capable of swinging from an approximately-horizontal position in the tank to such position as is necessary to bring its other end to near the surface of the tank when full, and I prefer to construct the outer end of the tube with an orifice $t$, through which outflow may pass, and with one or more floats X, which serve as the means of moving this end of the tube. These floats are preferably connected to the tube by brackets $u$ in such a manner that they will be removed from the orifice $t$, and the end of the tube is flattened and so formed with a top wall $t'$ and an end wall $t''$ that the orifice will be on the top of said tube and when the tube is elevated will be some distance below the top surface of the liquid; but as the tube approaches the horizontal position this orifice will be brought nearer to and approximately in parallelism with this surface, as best seen in Fig. 1, in which at the left-hand side the position of the orifice when the tank is full is shown, while at the right-hand side its position when the tank is nearly empty is seen. The floats X sustain more of the weight of the tube when it is in the lower position than when it is elevated, and consequently are more deeply immersed as the emptying of the tank proceeds, thus additionally insuring the variation in the relation of the outlet-orifice to the surface of the liquid. The tubes being filled with liquid are practically prevented from taking in any of the coagulating agent in the solution during the charging of the tank, since no matter what the agitation of this solution the contents of the tubes is stationary. To limit the fall, each is shown as provided with a stop $u'$, which may rest on the bottom of the tank. This stop is so proportioned that it will not strike the bottom until the outlet-orifice has descended to such a point that the float V will be certain to operate its trip T before the surface of the liquid in the tank falls to the level of the outlet. Both the discharge-pipe and float V are so adjusted that there may be no danger of the outlet-orifice falling so low as to draw coagulum from the stratum $y$ before the float acts to close the discharge from the tank. By the time the outlet-orifice $t$ has reached its lowermost position the coagulum will have settled into a compact stratum on the bottom of the tank, leaving the clear stratum $x$ of pure water, from which discharge will be drawn until the discharge-valve closes.

In operation the tanks will be charged and discharged alternately, one filling quickly and having a sufficient period of rest to allow precipitation to advance until there is a clear stratum of pure water at its top before discharge from the other is completed and the other discharging with a rapidity approximately coinciding with the speed of the descent of the coagulum, a speed which I find to be sufficient when the parts are properly proportioned to permit emptying of one tank in about the time necessary to fill the other and bring it to a state from which discharge may commence. The various automatically-operating valves, their operating-floats, and the lost-motion devices are all adjusted and timed to cause the proper sequence of operations, so that as one tank empties the first result will be the closing of its discharge-valve and the opening of the discharge-valve of the other tank, and the next result will be the opening of the supply-valve of the emptied tank. The falling float V, Fig. 1, is in the act of tilting the trip T, and the float has descended under the impulse of its weight $u''$ until it has almost thrown the trip over the dead-center. A slight further movement will permit the trip to fall, whereupon its first effect will be to throw the valve $K''$, permitting an instant reversal of the discharge-valves, which will bring them to the position in Fig. 3 and cut off discharge from the tank A simultaneously with opening that from tank A'. As the shifting of the valve $K''$ is almost completed the trip will disengage the catch S, permitting the holder R and float Q to fall, thus reversing the valve K, causing an immediate opening of the feed-valve C. The capacity of the spout B' and the pressure in the main B will cause a rapid filling of the tank A. The float X will lift the discharge-orifice end of the tube $p$ with the rising level of the solution entering the tank. The inclination of the spout B', together with the force of the discharge of the solution through it, will cause a thorough agitation of the solution within the tank and the mixing of the deposited coagulum with the fresh charge. The valve C will remain fully open until the rising solution has lifted the float Q until the holder R is engaged by the catch S, whereupon the reversal of pressure in the cylinder I will cause a quick closing of the supply-valve C. The charge can then gradually come to rest, and precipitation may thereupon take place. With the coagulating agents most commonly used I have found that only a few moments are required after the charge has come to rest for the formation of a stratum of pure water at the top of the tank of sufficient depth to permit discharge from this stratum without disturbing the descending stratum of coagulum. The speed of discharge from the one tank is adjusted to insure the formation of a sufficient stratum of pure water in the other before the discharging-tank is emptied enough to open the discharge-valve from the tank in which settling is progressing. During the discharge from the discharging-tank the coagulum is rapidly settling and constantly deepening the stratum of purified water unless the discharge is sufficiently rapid to keep pace with the speed of descent of the coagulum. For safety and to provide for unexpected contingencies I prefer to adjust the discharge to slightly less than the speed of descent of the coagulum; but it may be of the same speed or of a materially-lesser speed, as desired. Upon emptying of the discharging-tank its float V' throws the trip T'', thus causing the latter to reverse the valve $K''$, which immediately reverses the discharge-valves, closing discharge from the tank A' and opening it from tank A, after throwing which valve the trip releases the catch S', whereupon the float Q reverses the valve $K'$, the valve C' is opened, and refilling of the emptied tank begins. As each tank refills its float V or V' will rise and restore the trip without affecting any other part of the apparatus and will hold the trip in its upward position until the emptying of the tank causes the float to operate the trip. Thus it will be seen that each tank automatically closes its own discharge and opens the discharge from the other and automatically opens its own supply and closes such supply and that filtration sedimentation can be accomplished by this apparatus in such manner that there will be a practically-constant discharge of pure water, the one discharge-valve opening as the other closes, while there is an intermittent flow of solution first to one tank and then to the other and the settling or sedimentation process is progressing in each tank both prior to and during the discharge therefrom.

Figures 7, 8:
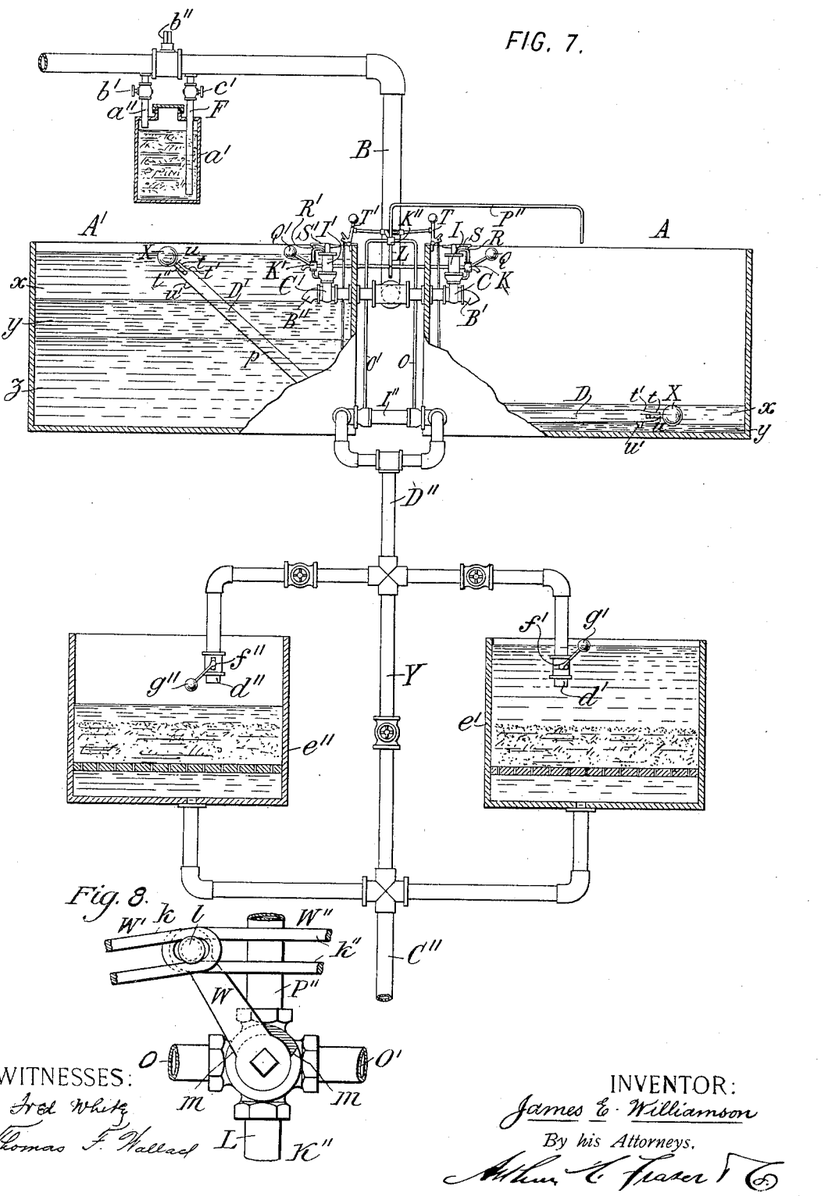
Fig. 7 is a diagrammatic view illustrating one installation of my improved apparatus, including suitable filtration-tanks, connections, &c.
Fig. 8 is a detail view.

The tanks A A' may be used as reservoirs and settling-tanks for the solution, which latter may be supplied from the main B, the supply being controlled by gate-valves C C'. The coagulating agent can be suitably introduced into the liquid, as by the supply-pipe F, receiving a solution of the agent from the tank $a'$, which is fed through a pipe $a''$ with water from the main B, valves $b'$, $b''$, and $c'$ being interposed in the pipes $a''$ F and main B to control the flow of water through the main and divert a portion of the flow through the vessel $a'$, according to a well-known system. The valves C C' may be automatically operated by the level of the solution in their respective tanks to charge these tanks respectively. The discharge-valves E and E' may be automatically moved, so that the lowering of the level in one tank will terminate its discharge and open that of the other, and vice versa, and the discharge-orifice may be raised and lowered with the rise and fall of the level in the tanks and maintained at a point within the stratum of pure water, all as set forth with reference to my improved apparatus, which is here illustrated as the means for operating and controlling the filling, sedimentation, and discharging processes. The discharge-main D'' instead of leading directly to the service-pipe C'' may be branched into spouts d' and d'', discharging, respectively, into filter-bed tanks e' and e'' and each controlled by a butterfly or damper valve f' f'', consisting of the usual pivoted disk and turning to right angles with the spout as its float g' or g'' rises and turning toward the open position or into a plane parallel with the axis of the spout as its float falls, according to a method well known for controlling filter-beds. The service-main C'' may draw from both filter-beds, as shown.

With this apparatus, for the various elements of which any known or suitable substitutes may be employed, the one tank will be charged quickly while the other is being discharged at a speed approximating the speed of the purification of the water within it, and upon completion of the discharge from one tank discharge of the other may be either manually or automatically started, simultaneously with or at approximately the same time as the termination of discharge from the tank just emptied. The discharge from each tank can be taken at a point just above the stratum of coagulum therein and can continue during the formation and descent of this stratum, so that the emptying of the tank will not occupy a materially-longer period than that necessary to the purification of its contents by sedimentation. The discharge from the settling-tank will be a practically-uniform outflow. The purified liquid will be collected and stored in filter-tanks free from foreign matter, separated from it by coagulation and precipitation and free from the coagulating agent, and the purified liquid can be withdrawn from the filter-beds for service as required for use. The periods of rest requisite to starting of precipitation and the intermittent and alternate operations of charging the settling-tanks will not interfere with the continuity and uniformity of the flow to the filter-beds or service-pipe, and the liquid entering the filter-beds will be so free from foreign matter and coagulating agent that the cleaning of these beds will only be necessary at most infrequent periods, if at all, and in many instances the discharge from the settling-tanks will be so pure that the filter-beds may be entirely dispensed with or used only as storage-tanks.

It will be seen that my invention provides improvements which can be readily and advantageously availed of, and it will be understood that I do not limit myself to the particular details of construction, arrangement, and combination of parts set forth as constituting the preferred form of my improved apparatus, since any suitable or equivalent constructions may be substituted for those shown.

What I claim is—

1. In filtration apparatus, the combination with a settling-tank, and supply and discharge mains therefor, of a quick-acting supply-valve controlling feed to said tank, and means moving said valve, and means operated by the rise of level in said tank, controlling the closing of said valve and permitting its rapid closure at a predetermined level.

2. In filtration apparatus, a settling-tank, and supply and discharge mains therefor, in combination with a supply-valve for said tank, means holding said valve closed during emptying of the tank, and automatically-operated means quickly opening said valve at a predetermined level of the charge in said tank.

3. In filtration apparatus, a settling-tank, and supply and discharge mains therefor, in combination with a supply-valve for said tank, hydraulic means operating said valve, a controlling-valve for said hydraulic means, a float operating said controlling-valve and at a predetermined time moving it to the position for closing said supply-valve, means holding said controlling-valve in such position during emptying of the tank, a float releasing said controlling-valve at a predetermined level, and means throwing the controlling-valve to a position for quickly opening said supply-valve when the controlling-valve is so released.

4. In filtration apparatus, a settling-tank and supply and discharge mains therefor, in combination with a supply-valve, a piston operating such valve, a cylinder for such piston, fluid-pressure pipes for said cylinder, a controlling-valve for directing pressure into said cylinder at one side or the other of said piston, and means automatically operating said controlling-valve at predetermined levels of the charge in the tank, whereby said supply-valve is automatically quickly opened and closed.

5. In filtration apparatus, a settling-tank and supply and discharge mains therefor, in combination with a supply-valve C, quick-acting means for operating said valve, a float Q controlling closing of said valve, a holder R controlling opening of said valve, a catch S engaging said holder when the latter is in position for maintaining said valve closed, and a float operating said catch for releasing said holder at a predetermined fall of the level of the charge in the tank.

6. In filtration apparatus, a settling-tank and supply and discharge mains therefor, in combination with a supply-valve, means for operating said valve, means for holding said valve in closed position, a catch controlling said means, a trip T for controlling said catch, movable to an inactive position at one side of its dead-center and falling to an active position at the other side thereof, and a float moving said trip across its dead-center.

7. In filtration apparatus, a settling-tank, and supply and discharge mains therefor, in combination with a supply-valve, means for holding such valve closed, a catch for releasing such means, a trip operating said catch, a float operating said trip, and a lost-motion connection between said float and trip, permitting independent movement of the one relatively to the other.

8. In filtration apparatus, a settling-tank and supply and discharge mains therefor, in combination with a supply-valve C, cylinder I, piston J connected to said valve for operating it, controlling-valve K, float Q for moving said valve K, holder R for holding said valve K in one position, catch S engaging said holder, trip T for operating said catch, float V for operating said trip, and a lost-motion connection between said float and trip, permitting independent motion of said parts.

9. In filtration apparatus, a settling-tank and supply and discharge mains therefor, in combination with a valve for said tank, quick-acting means operating said valve, a controlling device for said means, a float in said tank operating said controlling device and a lost-motion connection between said float and said controlling-valve for shifting the latter quickly upon a predetermined descent of the float.

10. In filtration apparatus, the combination with a settling-tank and supply and discharge mains therefor, of a discharge-valve for the tank, a float in the tank controlling the closing of said valve, quick-acting means operating said valve, a controlling-valve for said means, a trip connected to said controlling-valve and operated by said float, and a lost-motion device between said trip and controlling-valve permitting independent movement of the trip to a predetermined extent.

11. In filtration apparatus, a settling-tank and supply and discharge mains therefor, in combination with a discharge-valve for the tank, a float in the tank controlling closing of said valve, means operating said valve, means controlling said operation, a gravity-trip connected to said controlling means and movable from one to the other side of its dead-center, and a lost-motion connection between said float and said trip for moving the latter and for permitting it to fall by gravity at a predetermined time.

12. In filtration apparatus, a settling-tank, and supply and discharge mains therefor, in combination with a discharge-valve, means for closing said valve, a float in said tank, a controlling device for said valve-closing means, a trip for operating said controlling device, a lost-motion connection between the latter and said trip, and a lost-motion connection between said trip and float.

13. In filtration apparatus, a settling-tank and supply and discharge mains therefor, in combination with a discharge-valve, a piston J connected thereto, a cylinder I'' for said piston, fluid-pressure pipes communicating with opposite ends of said cylinder, a valve K'' controlling flow through said pipes, an arm W for said valve, a trip T, a link W', connecting said arm and trip for operating said valve K'', and a float V in said tank for operating said trip.

14. In filtration apparatus, a settling-tank, supply and discharge mains therefor, in combination with a supply-valve, quick-operating means therefor, a controller for said means, a float operating said controller at a predetermined charging of the tank for quickly closing said valve, means preventing opening said valve during emptying of the tank, a discharge-valve, quick-acting means closing said discharge-valve, a controller for said means, holding said valve open during emptying of the tank, and a second float operating said controller and throwing the latter to position for closing the discharge-valve at a predetermined level in the tank, and releasing the controlling means of said supply-valve, and permitting the latter to open upon the closing of the discharge-valve.

15. In filtration apparatus a settling-tank and supply and discharge valves therefor, in combination with means automatically operating said valves controlled by the level of the charge in the tank, and closing the discharge-valve and opening the supply-valve at substantially the same time, and independent means automatically closing the supply-valve independently of the discharge-valve, and while the latter is closed, at a predetermined charging of the tank, whereby charging of the tank may begin immediately its discharge-valve is closed, and the contents of the fully-charged tank may come to rest and sedimentation may start before the discharge-valve is again opened.

16. In filtration apparatus a settling-tank and supply and discharge valves therefor, in combination with means automatically operating said valves controlled by the level of the charge in the tank, and closing the discharge-valve and opening the supply-valve at substantially the same time, and independent means automatically closing the supply-valve independently of the discharge-valve, and while the latter is closed, at a predetermined charging of the tank, whereby charging of the tank may begin immediately its discharge-valve is closed, and the contents of the fully-charged tank may come to rest and sedimentation may start before the discharge-valve is again opened, and independent means for opening said discharge-valve.

17. In filtration apparatus, a settling-tank and supply and discharge valves therefor, in combination with means for closing the discharge-valve and opening the supply-valve, and means automatically operating first the means for closing the discharge-valve and then the means for opening the supply-valve in succession.

18. In filtration apparatus, a settling-tank and supply and discharge mains and valves, in combination with a pipe conducting liquid under pressure from a source of fluid-pressure, a controlling-valve communicating with said pipe, a piston connected to the supply-valve, a cylinder for said piston, pipes communicating between said controlling-valve and opposite ends of said cylinder, and means automatically operating said controlling-valve with variations in level of the charge in said tank.

19. In filtration apparatus, a settling-tank and supply and discharge mains and valves therefor, in combination with a pipe conducting liquid from a source of fluid-pressure, a controlling-valve, a piston connected to the discharge-valve, a cylinder for said piston, pipes communicating between the controlling-valve and said cylinder, means automatically throwing said controlling-valve to position for closing said discharge-valve at a predetermined level of the charge in said tank.

20. In filtration apparatus, a plurality of settling-tanks and supply and discharge mains therefor, a supply-valve for each tank, means operating by the level of the charge in the tank for closing its supply-valve, a discharge-valve for each tank, means operated by the level of the charge in one tank for opening the discharge-valve of the other tank and closing its own discharge-valve, and means opening the supply-valve of a tank upon the closing of its discharge-valve.

21. In filtration apparatus, a plurality of tanks, and supply and discharge mains therefor, in combination with independent supply-valves for said tanks, means for operating said valves to alternately charge said tanks, discharge-valves for said tanks, and means simultaneously closing the discharge-valve of an empty tank and opening that of a charged tank.

22. In filtration apparatus, a plurality of settling-tanks and supply and discharge mains therefor, in combination with supply-valves for said tanks, means automatically closing said valves, discharge-valves for said tanks and means automatically opening the discharge-valve of a charged tank and the supply-valve of an empty tank at approximately the same time.

23. In filtration apparatus, a plurality of settling-tanks and supply and discharge mains therefor, in combination with independent supply-valves for said tanks, discharge-valves for said tanks, a connection between said discharge-valves, means automatically closing said supply-valves and a float in each tank operating at a predetermined fall in the level of the charge thereof, opening the discharge-valve of the other tank and opening its own supply-valve.

24. In filtration apparatus, a plurality of settling-tanks in combination with means quickly filling and holding at rest the charge of one tank during the emptying of another tank, means quickly filling and then holding at rest the charge of the latter tank during the emptying of the first tank, and means automatically reversing the operation of said tanks coincident with the lowering of the level of the charge in the one being emptied to a predetermined point.

25. In filtration apparatus, two settling-tanks and supply and discharge valves therefor, in combination with means for controlling said valves, two trips, each movable across its dead-center, for operating said controlling means, lost-motion connections between said trips respectively and said means, and floats in said tanks for operating said trips, the float in one tank permitting one trip to fall and shift said controlling means at a predetermined level of the charge in the tank, and the float in the other tank maintaining the other trip in inactive position pending the emptying of its tank.

26. In filtration apparatus, two settling-tanks and supply and discharge valves therefor, in combination with the controlling-valve K'' for said discharge-valves, trips T' T', lost-motion connections W' W'' between said trips and said controlling-valve, and floats V V' in said tanks respectively for operating the respective trips, substantially as and for the purposes set forth.

27. In filtration apparatus, two tanks and supply and discharge valves therefor, in combination with automatic means closing said supply-valves, holders for holding said means in position for closing said valves, catches for said holders, means controlling the positions of the discharge-valves, trips for shifting the latter means from the position for closing one valve to that for closing the other, and floats in said tanks respectively for operating said trips, the float of an emptying tank moving its trip to position for closing its discharge-valve and opening that of the other tank, lost-motion connections between said floats and trips, and said trips and the means for controlling said discharge-valves, each of said trips when operating said controlling-valve also releasing the catch of the supply-valve of the emptied tank, whereby opening of this valve and recharging of the tank commences approximately at the same time that closing of its discharge-valve is effected.

28. In filtration apparatus, a settling-tank in combination with a movable discharge-pipe therefor having an outlet-orifice near the surface of the charge in the tank and movable downwardly with the lowering of such surface during emptying of the tank, with an increasing proximity to such surface throughout its downward movement.

29. The improved discharge-pipe for settling-tanks and the like consisting of a tube $p$ having an outlet-orifice $t$ and a float X at one end and a swivel connection $r$ at its other end.

30. In filtration apparatus, a plurality of settling-tanks and supply and discharge mains therefor, in combination with means for successively filling said tanks, means for successively emptying said tanks, and discharge-pipes for said tanks having downwardly-moving outlet-orifices, and means for lowering the orifice of each pipe with the descent of the level of the charge in its tank, whereby the charge of one tank may be withdrawn from a predetermined stratum near its surface while another tank is being charged and precipitation therein being inaugurated, and upon the emptying of one tank it can be recharged and the charged tank can be emptied by withdrawing from the stratum of clear liquid above the descending precipitate within it.

31. In filtration apparatus, a plurality of settling-tanks, and means for supplying solution thereto, in combination with means for discharging from each tank successively at the upper portion of the charge in the tank above the stratum of descending precipitate therein and during the descent of such precipitate, whereby precipitation and discharge can proceed simultaneously in one tank while charging and the inauguration of precipitation are being effected in another tank.

32. In filtration apparatus, two tanks and supply and discharge mains therefor, in combination with means automatically discharging first from one of said tanks and then from the other of said tanks at a predetermined speed of discharge, of means automatically feeding solution first to one tank and then to the other at a greater speed than said speed of discharge, and feeding to one tank during a portion of the time while the other is discharging, and to the other tank during a portion of the time while that previously fed is discharging, said feeding means adapted to charge an emptied tank during the first portion of the emptying of a filled tank, whereby during the completion of the emptying of a filled tank the contents of the charged tank may come to rest and sedimentation may be inaugurated therein.

In witness whereof I have hereunto signed my name in the presence of two subscribing witnesses.

JAMES E. WILLIAMSON.

Witnesses:
GEORGE H. FRASER,
THOMAS F. WALLACE.